US009280948B2

(12) United States Patent
Kim et al.

(10) Patent No.: US 9,280,948 B2
(45) Date of Patent: Mar. 8, 2016

(54) SYSTEM ON CHIP AND ELECTRONIC SYSTEM INCLUDING THE SAME

(71) Applicant: SAMSUNG ELECTRONICS CO., LTD., Suwon-si, Gyeonggi-do (KR)

(72) Inventors: Kyoung-Man Kim, Suwon-si (KR); Jong-Ho Roh, Yongin-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 148 days.

(21) Appl. No.: 13/940,519

(22) Filed: Jul. 12, 2013

(65) Prior Publication Data

US 2014/0028692 A1 Jan. 30, 2014

(30) Foreign Application Priority Data

Jul. 26, 2012 (KR) ........................ 10-2012-0081600

(51) Int. Cl.

| | |
|---|---|
| ***G06F 15/16*** | (2006.01) |
| ***G06F 15/00*** | (2006.01) |
| ***G06T 1/00*** | (2006.01) |
| ***G09G 5/00*** | (2006.01) |
| ***G09G 3/20*** | (2006.01) |

(52) U.S. Cl.

CPC .................. *G09G 5/003* (2013.01); *G09G 3/20* (2013.01); *G09G 2330/021* (2013.01); *G09G 2330/022* (2013.01); *G09G 2340/0435* (2013.01); *G09G 2340/16* (2013.01)

(58) Field of Classification Search

None

See application file for complete search history.

(56) References Cited

U.S. PATENT DOCUMENTS

| | | | | |
|---|---|---|---|---|
| 7,250,927 | B2 | 7/2007 | Yamazaki et al. | |
| 7,659,908 | B2 * | 2/2010 | Yamaura | 345/560 |
| 7,721,118 | B1 * | 5/2010 | Tamasi et al. | 713/300 |
| 8,368,702 | B2 * | 2/2013 | Niederauer et al. | 345/502 |
| 8,599,207 | B2 * | 12/2013 | Iwase et al. | 345/501 |
| 8,810,586 | B2 * | 8/2014 | Sudo | 345/520 |
| 2007/0222774 | A1 * | 9/2007 | Foster | 345/204 |
| 2008/0204460 | A1 * | 8/2008 | Marinkovic et al. | 345/502 |
| 2009/0153540 | A1 * | 6/2009 | Blinzer et al. | 345/212 |
| 2010/0315427 | A1 * | 12/2010 | Wyatt et al. | 345/502 |
| 2011/0206126 | A1 * | 8/2011 | Kim | 375/240.16 |
| 2011/0298812 | A1 * | 12/2011 | Liu et al. | 345/502 |
| 2012/0242671 | A1 * | 9/2012 | Wyatt | 345/520 |
| 2013/0038615 | A1 * | 2/2013 | Hendry et al. | 345/502 |

FOREIGN PATENT DOCUMENTS

KR 1020100117323 A 11/2010

* cited by examiner

*Primary Examiner* — Jacinta M Crawford

(74) *Attorney, Agent, or Firm* — F. Chau & Associates, LLC

(57) ABSTRACT

A system on chip (SoC) includes a first display subsystem configured to perform first and second imaging functions and a second display subsystem configured to only perform the first imaging function. The SoC is configured to activate one of the display subsystems and deactivate the other display subsystem based on a comparison of a current frame of image data and a previous frame of image data.

15 Claims, 9 Drawing Sheets

100

SYSTEM ON CHIP AND ELECTRONIC SYSTEM INCLUDING THE SAME

CROSS-REFERENCE TO RELATED APPLICATION

This application claims priority under 35 USC §119 to Korean Patent Application No. 10-2012-0081600, filed on Jul. 26, 2012, in the Korean Intellectual Property Office (KIPO), the disclosure of which is incorporated by reference in its entirety herein.

BACKGROUND

1. Technical Field

Exemplary embodiments of the inventive concept relate generally to a semiconductor integrated circuit, and more particularly to a system on chip including a display control system and an electronic system including the system on chip.

2. Discussion of Related Art

A system on chip (SoC) refers to a chip in which various semiconductor components are integrated or a system integrated in the chip. The SoC may be mounted on various electronic systems. The demand for an SoC with a higher operating speed and lower power consumption is increasing. For instance, the SoC may include a display control system to drive a display device included in an electronic system.

SUMMARY

At least one exemplary embodiment of the inventive concept provides a system on chip capable of selectively reducing power consumption according to operation modes.

At least one exemplary embodiment of the inventive concept provides an electronic system including a system on chip capable of selectively reducing power consumption according to operation modes.

According to an exemplary embodiment of the inventive concept, a system on chip (SoC) includes a first display subsystem configured to perform first and second imaging functions, and a second display subsystem configured to only perform the first imaging function. The SoC is configured to activate one of the display subsystems and deactivate the other display subsystem based on a comparison of a current frame of image data and a previous frame of image data. In an exemplary embodiment, the SoC activates the first display subsystem when the comparison indicates the current frame is substantially the same as the previous frame and otherwise activates the second display subsystem. In an exemplary embodiment, on average, the SoC consumes more power when the first display subsystem is active as compared to when the second display subsystem is active. In an exemplary embodiment, the second imaging function increases an image quality of image data and the first imaging function excludes an imaging function that increases the image quality. In an exemplary embodiment, each display subsystem includes a power supply and the SoC deactivates the display subsystem by sending a signal to the power supply and the power supply suppresses power to other units of the display subsystem in response to receipt of the signal.

According to an exemplary embodiment of the inventive concept, a system on chip (SoC) includes a frame buffer, a mode detector, a first display subsystem, a second display subsystem and an output buffer. The frame buffer stores input image data in a unit of frame and provides internal image data in units of frames. The internal image data corresponds to the input image data. The mode detector generates a mode detection signal based on the input image data. The mode detection signal represents an operation mode according to power consumption. The first display subsystem is selectively activated based on the mode detection signal to generate first image data and a first control signal based on the internal image data, which are provided from the frame buffer in units of frames, and the mode detection signal. The second display subsystem is activated complementarily with the first display subsystem based on the mode detection signal to generate second image data and a second control signal based on the internal image data, which are provided from the frame buffer in units of frames, and the mode detection signal. The output buffer provides output image data by selecting one of the first and second image data based on the mode detection signal and provides an output control signal by selecting one of the first and second control signals based on the mode detection signal.

The operation mode may include a first operation mode where an additional process for a current frame corresponding to the input image data is performed when the current frame differs from a previous frame and a second operation mode where the additional process for the current frame is not performed when the current frame is substantially the same as the previous frame.

The first display subsystem may be activated in the first operation mode and the second display subsystem may be activated in the second operation mode.

The first display subsystem may include a power supply unit, a display controller and an image enhancement unit. The power supply unit may selectively supply power to part of the first display subsystem based on the mode detection signal. The display controller may generate third image data and a third control signal based on the internal image data when the power is supplied to the first display subsystem. The image enhancement unit may generate the first image data and the first control signal by performing an image enhancing process with respect to the current frame based on the third image data and the third control signal when the power is supplied to the first display subsystem.

The second display subsystem may include a power supply unit and a display controller. The power supply unit may selectively supply power to the second display subsystem based on the mode detection signal. The display controller may generate the second image data and the second control signal based on the internal image data without performing an image enhancing process with respect to the current frame when the power is supplied to the second display subsystem.

The first and second display subsystems may be included in mutually different power domains, respectively.

The SoC may further include a processor. The processor may control an operation of the SoC and configured to generate a determination signal by comparing the current frame with the previous frame. The mode detector may generate the mode detection signal based on the determination signal.

The mode detector may generate the mode detection signal by comparing the current frame with the previous frame.

The output buffer may include a first multiplexer and a second multiplexer. The first multiplexer may include a first input terminal to receive the first image data, a second input terminal to receive the second image data, a selection terminal to receive the mode detection signal and an output terminal to selectively output one of the first image data and the second image data as the output image data in response to the mode detection signal. The second multiplexer may include a first input terminal to receive the first control signal, a second input terminal to receive the second control signal, a selection terminal to receive the mode detection signal and an output terminal to selectively output one of the first control signal and the second control signal as the output control signal in response to the mode detection signal.

The first multiplexer may output the first image data as the output image data in the first operation mode and may output the second image data as the output image data in the second operation mode.

The second multiplexer may output the first control signal as the output control signal in the first operation mode and may output the second control signal as the output control signal in the second operation mode.

The output buffer may further include a frame sync adjustment unit. The frame sync adjustment unit may prevent frame mismatch occurring when the output image data and the output control signal are changed.

The frame sync adjustment unit may prevent the frame mismatch, which occurs when the output image data and the output control signal are changed, based on a first trigger signal provided from the first display subsystem and a second trigger signal provided from the second display subsystem.

The SoC may include a mobile SoC, a multimedia SoC or an application processor SoC.

According to an exemplary embodiment of the inventive concept, an electronic system includes a system on chip (SoC) and a display device. The SoC generates output image data and an output control signal based on input image data. The display device displays images based on the output image data and the output control signal. The SoC includes a frame buffer, a mode detector, a first display subsystem, a second display subsystem and an output buffer. The frame buffer stores the input image data in a unit of frame and provides internal image data in units of frames. The internal image data corresponds to the input image data. The mode detector generates a mode detection signal based on the input image data. The mode detection signal represents an operation mode according to power consumption. The first display subsystem is selectively activated based on the mode detection signal to generate first image data and a first control signal based on the internal image data, which are provided from the frame buffer in units of frames, and the mode detection signal. The second display subsystem is activated complementarily with the first display subsystem based on the mode detection signal to generate second image data and a second control signal based on the internal image data, which are provided from the frame buffer in a unit of frame, and the mode detection signal. The output buffer provides output image data by selecting one of the first and second image data based on the mode detection signal and provides the output control signal by selecting one of the first and second control signals based on the mode detection signal.

As described above, a system on chip according to at least one exemplary embodiment of the inventive concept includes two display subsystems selectively activated according to the operation mode. Power consumption may be determined based on input image data (e.g., based on repetition of image frames corresponding to the input image data). In a first operation mode, in which an additional process for images (e.g., a process for enhancing image quality) is performed so relatively high power is consumed, only the first display subsystem is activated to display the image having high quality. In the second operation mode, in which the additional process for images is not necessary so relatively less power is consumed, only the second display subsystem is activated. Therefore, power consumption can be reduced in a system on chip and an electronic system including the same according to at least one embodiment of the inventive concept. In addition, in a system on chip according to at least one embodiment of the invention concept, the two display subsystems share one frame buffer, so the size of the system on chip and the electronic system including the same can be reduced.

BRIEF DESCRIPTION OF THE DRAWINGS

Exemplary embodiments of the inventive concept will be more clearly understood from the following detailed description taken in conjunction with the accompanying drawings.

DETAILED DESCRIPTION

Figure 1:
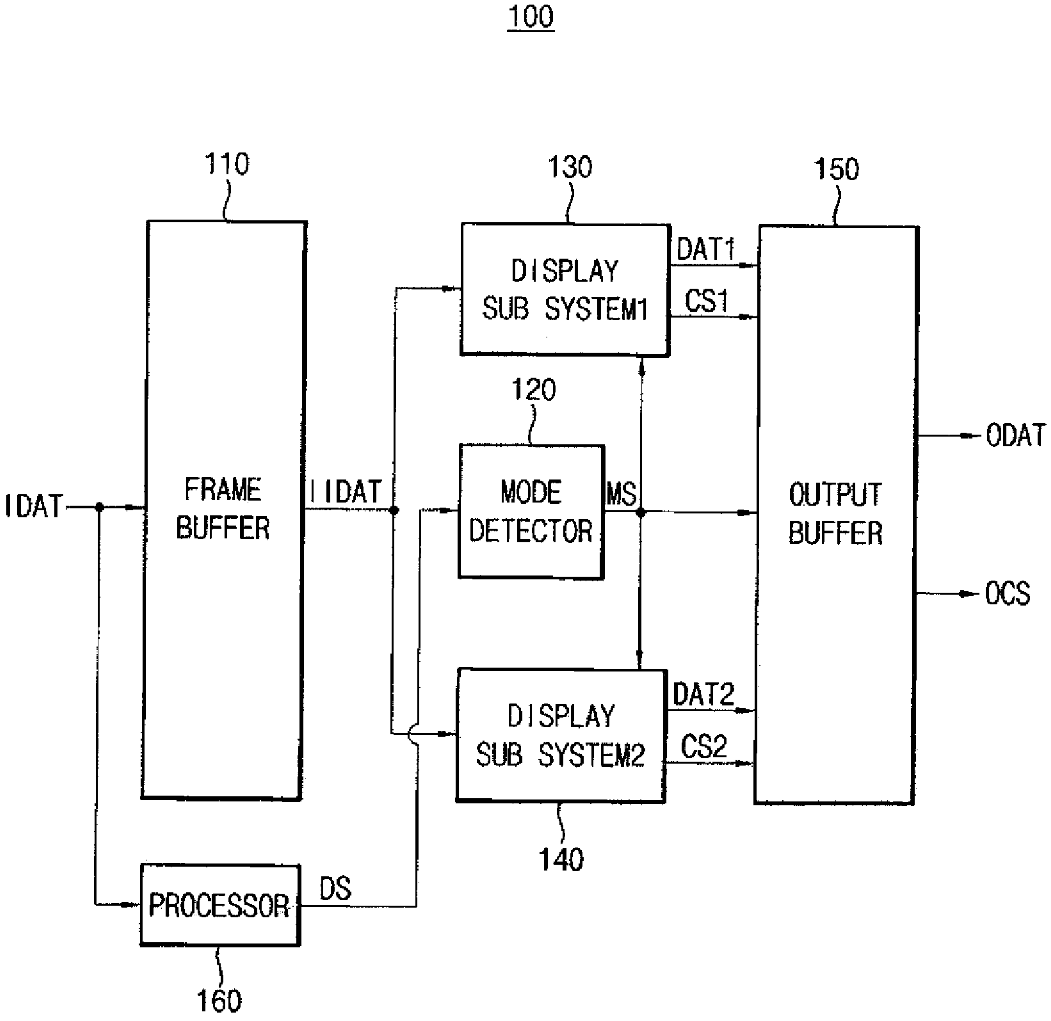
FIG. 1 is a block diagram illustrating a system on chip according to an exemplary embodiment of the inventive concept.

The inventive concept will be described more fully with reference to the accompanying drawings, in which exemplary embodiments thereof are shown. This inventive concept may, however, be embodied in many different forms and should not be construed as limited to the embodiments set forth herein. Like reference numerals refer to like elements throughout this application.

It will be understood that when an element is referred to as being "connected" or "coupled" to another element, it can be directly connected or coupled to the other element or intervening elements may be present. As used herein, the singular forms "a," "an" and "the" are intended to include the plural forms as well, unless the context clearly indicates otherwise.

FIG. 1 is a block diagram illustrating a system on chip according to an exemplary embodiment of the inventive concept.

At least one exemplary embodiment of the inventive concept can be implemented to reduce power consumption in a system on chip including a display control system. In the following description, the system on chip 100 according to exemplary embodiments will be described while focusing on the structure and operation of components related to the display control system.

Referring to FIG. 1, the system on chip (SoC) 100 includes a frame buffer 110, a mode detector 120, a first display subsystem 130, a second display subsystem 140 and an output buffer 150. The SoC 100 may further include a processor 160.

The frame buffer 110 stores input image data IDAT in units of frames and provides internal image data IIDAT, which corresponds to the input image data IDAT, in units of frames. For instance, the internal image data IIDAT may include a plurality of frames of data.

The mode detector 120 generates a mode detection signal MS, which represents an operation mode according to power consumption, based on the input image data IDAT. For instance, the mode detector 120 may generate the mode detection signal MS based on a determination signal provided from the processor 160.

In an exemplary embodiment, the operation mode is set to either a first operation mode or a second operation mode. In other words, the SoC 100 according to an exemplary embodiment of the inventive concept operates in either the first operation mode or the second operation mode. The first operation mode is a high quality mode and the second operation mode is a low power mode (e.g., user interface (UI) mode). The SoC 100 performs normal processing functions for images in both the high quality mode and the lower mode, but may perform an additional processing function for the images (e.g., a process for enhancing image quality) in the high quality mode. Since the SoC 100 does not perform the additional processing function in the low power mode, power consumption may be reduced. Examples of the normal processing functions may include conversion of analog digital signals to digital image signals, noise reduction, etc.). The mode detection signal MS has a first logic level (e.g., logic high level) in the first operation mode (e.g., the high power mode) and has a second logic level (e.g., logic low level) in the second operation mode (e.g., low power mode).

In an exemplary embodiment, the operation mode is determined based on repetition of image frames corresponding to the input image data. For instance, if a current frame in an image corresponding to the input image data IDAT is different from a previous frame (that is, when the image frames are not repeated), the SoC 100 operate in the first operation mode (e.g., high power mode) to perform the additional process for the current frame. For example, when a subsequent frame differs from a previous frame, the image displayed during these frames may be a moving image. If the current frame is substantially identical to the previous frame (that is, when the image frames are repeated), the SoC 100 operate in the second operation mode (e.g., the low power mode) without performing the additional process for the current frame. When a subsequent frame is substantially identical to the previous frame, the image displayed during these frames may be a static image. According to an exemplary embodiment of the inventive concept, the operation mode is determined by comparing at least three frames with each other. In an exemplary embodiment, the frames are sequential to one another. For example, if first, second, and third frames are all substantially identical, the lower power mode is used. In an exemplary embodiment, the low power mode is used when differences among at least three sequential frames do not exceed a predetermined threshold difference, and the high quality mode is used otherwise.

The first display subsystem 130 is selectively activated based on the mode detection signal MS. For instance, the first display subsystem 130 is activated in the first operation mode (e.g., high quality mode) and deactivated in the second operation mode (e.g., low power mode). The first display subsystem 130 generates first image data DAT1 and a first control signal CS1 based on the internal image data IIDAT, which are provided from the frame buffer 110 in units of frames, and the mode detection signal MS. The first image data DAT1 may be obtained by performing the image enhancing process with respect to the internal image data IIDAT. In an exemplary embodiment, the first control signal CS1 includes a first clock signal, a first vertical line start signal and a first horizontal line start signal to display images corresponding to the first image data DAT1 to a display device (not shown). The first display subsystem 130 may be referred to as a main display subsystem.

The second display subsystem 140 is activated complementarily with the first display subsystem 130 based on the mode detection signal MS. For instance, the second display subsystem 140 is activated in the second operation mode and deactivated in the first operation mode. The second display subsystem 140 generates second image data DAT2 and a second control signal CS2 based on the internal image data IIDAT, which are provided from the frame buffer 110 in units of a frames, and the mode detection signal MS. The second image data DAT2 is obtained without performing the image enhancing process with respect to the internal image data IIDAT. For example, the second image data DAT2 may be substantially identical to the internal image data IIDAT. In an exemplary embodiment, the second control signal CS2 includes a second clock signal, a second vertical line start signal and a second horizontal line start signal to display images corresponding to the second image data DAT2 to the display device. In an exemplary embodiment, the second display subsystem 140 is a power optimized display subsystem and may be referred to as an auxiliary display subsystem.

The output buffer 150 provides output image data ODAT by selecting one of the first and second image data DAT1 and DAT2 based on the mode detection signal MS and provides an output control signal OCS by selecting one of the first and second control signals CS1 and CS2 based on the mode detection signal MS. For instance, the output buffer 150 outputs the first image data DAT1 and the first control signal CS1 as the output image data ODAT and the output control signal OCS, respectively, in the first operation mode and outputs the second image data DAT2 and the second control signal CS2 as the output image data ODAT and the output control signal OCS, respectively, in the second operation mode.

The processor 160 controls the overall operation of the SoC 100 and may generate the determination signal DS including information about the operation mode by comparing the current frame with the previous frame. For instance, if the difference between first frame data corresponding to the previous frame and second frame data corresponding to the current frame is less than a predetermined reference value, the processor 160 determines that the current frame is substantially identical to the previous frame. In addition, if the difference between first frame data and second frame data is greater than the predetermined reference value, the processor 160 determines that the current frame is different from the previous frame. In an exemplary embodiment, the processor 160 generates the determination signal DS including information about the operation mode by comparing the current frame against at least two previous frames. For instance, if the difference between the current frame and all the previous frames is less than a predetermined reference value, the processor 160 determines that the frames are substantially identical, and otherwise the processor 160 determines that the frames are different from one another. The processor 160 may include a microprocessor or a central processing unit (CPU).

In an exemplary embodiment, the SoC 100 includes a mobile SoC, a multimedia SoC or an application process (AP) SoC.

Although the SoC 100 shown in FIG. 1 is illustrated as including only the components related to the display control system, the SoC 100 may further include various types of semiconductor integrated circuits and/or components according to exemplary embodiments.

If the SoC 100 had only one display subsystem, it could have a difficulty reducing power consumption. Thus, use of two display subsystem may enable the SoC 100 to better reduce power consumption.

The SoC 100 according to an exemplary embodiment of the inventive concept includes two display subsystems 130 and 140 selectively activated according to the operation mode. In the first operation mode, in which an additional process for images (e.g., a process for enhancing image quality) is performed so relatively large amount of power is consumed, only the first display subsystem 130 is activated to display the image having high quality. In the second operation mode, in which the additional process for images is not necessary so relatively less power is consumed, only the second display subsystem 140 is activated. Therefore, power consumption can be reduced in the SoC 100 and an electronic system including the same. In addition, the two display subsystems 130 and 140 share one frame buffer 110, so the size of the SoC 100 and the electronic system including the same can be reduced. In an exemplary embodiment, when a corresponding one of the display subsystems (e.g., 130 or 140) is deactivated, less power is provided to the deactivated display subsystem as compared to the activated display subsystem. For example, when a display subsystem is deactivated, the SoC 100 may prevent power from being applied to the deactivated display subsystem or reduce an amount of power being applied to the deactivated display subsystem to a level lower than the amount of power being applied to activated display subsystem.

Figure 2:
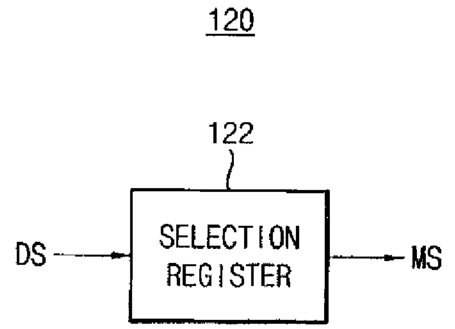
FIG. 2 is a block diagram illustrating a mode detector included in the system on chip of FIG. 1 according to an exemplary embodiment of the inventive concept.

FIG. 2 is a block diagram illustrating the mode detector included in the SoC of FIG. 1 according to an exemplary embodiment of the inventive concept.

Referring to FIG. 2, the mode detector 120 includes a selection register 122.

The selection register 122 receives and stores the determination signal DS including information about the operation mode and generates the mode detection signal MS based on the determination signal DS. For instance, if the difference between first frame data corresponding to the previous frame and second frame data corresponding to the current frame is less than a predetermined reference value, the determination signal DS includes information related to the second operation mode. In addition, if the difference between first frame data and second frame data is greater than the predetermined reference value, the determination signal DS includes information related to the first operation mode. As described above, the mode detection signal MS has the first logic level in the first operation mode and has the second logic level in the second operation mode.

Figure 3:
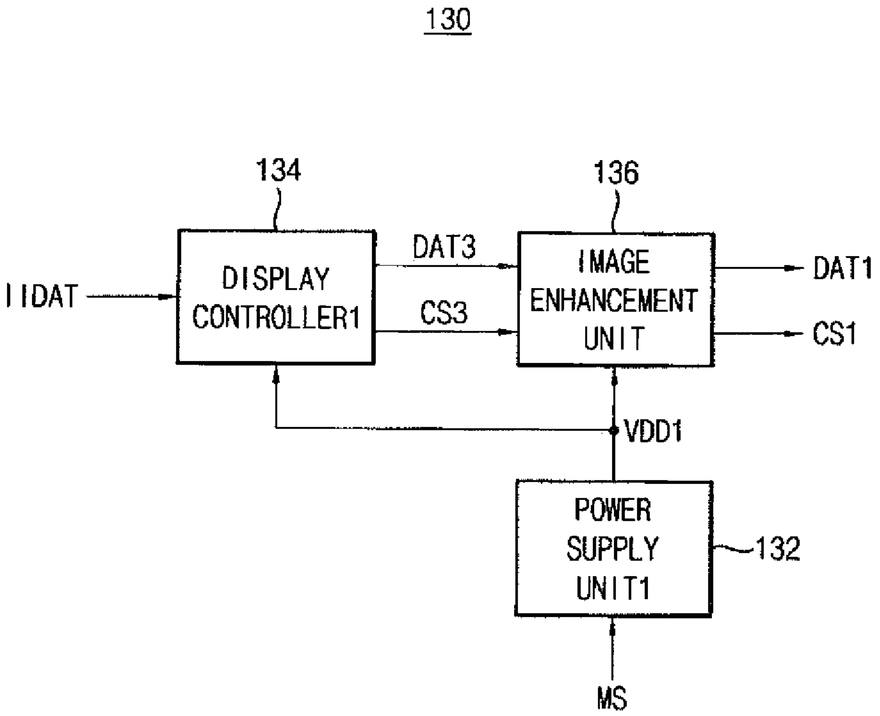
FIG. 3 is a block diagram illustrating a first display subsystem included in the system on chip of FIG. 1 according to an exemplary embodiment of the inventive concept.

FIG. 3 is a block diagram illustrating the first display subsystem included in the system on chip of FIG. 1 according to an exemplary embodiment of the inventive concept.

Referring to FIG. 3, the first display subsystem 130 includes a first power supply unit 132, a first display controller 134 and an image enhancement unit 136.

The first power supply unit 132 selectively supplies power to elements of the first display subsystem 130 based on the mode detection signal MS. For instance, the first power supply unit 132 supplies a first power supply voltage VDD1 to the first display controller 134 and the image enhancement unit 136 in the first operation mode (e.g., when the mode detection signal MS has the first logic level) and shuts off the first power supply voltage VDD1 being supplied to the first display controller 134 and the image enhancement unit 136 in the second operation mode (e.g., when the mode detection signal MS has the second logic level). The first power supply unit 132 may be implemented in the form of a transistor or a switch.

The first display controller 134 generates third image data DAT3 and a third control signal CS3 based on the internal image data IIDAT when the power is supplied to the first display subsystem 130 (e.g., when the first power supply voltage VDD1 is supplied to the first display controller 134). The third image data DAT3 corresponds to the internal image data IIDAT and the first display controller 134 may generate the third image data DAT3 by performing image format conversion or dithering with respect to the internal image data IIDAT. An example of image format conversion includes converting an image of format GIF to format JPEG, converting a movie image of format .MOV to .AVI, etc. While a few image and movie formats were listed, the invention concept is not limited to, any particular image or movie format for the format conversion.

The image enhancement unit 136 may generate the first image data DAT1 and the first control signal CS1 by enhancing the image quality of the current frame of the image corresponding to the input image data IDAT based on the third image data DAT3 and the third control signal CS3 when the power is supplied to the first display subsystem 130 (e.g., when the first power supply voltage VDD1 is supplied to the image enhancement unit 136). The first image data DAT1 may refer to the data that have been subject to the image enhancing process and the image enhancement unit 136 may generate the first image data DAT1 by adjusting, correcting and/or controlling the hue, brightness, contrast and saturation of the third image data DAT3.

Figure 4:
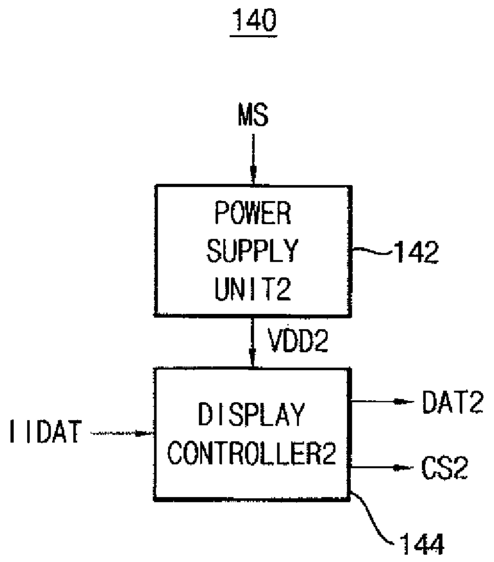
FIG. 4 is a block diagram illustrating a second display subsystem included in the system on chip of FIG. 1 according to an exemplary embodiment of the inventive concept.

FIG. 4 is a block diagram illustrating the second display subsystem included in the system on chip of FIG. 1 according to an exemplary embodiment of the inventive concept.

Referring to FIG. 4, the second display subsystem 140 includes a second power supply unit 142 and a second display controller 144.

The second power supply unit 142 selectively supplies power to elements of the second display subsystem 140 based on the mode detection signal MS. For instance, the second power supply unit 142 supplies a second power supply voltage VDD2 to the second display controller 144 in the second operation mode and shuts off the second power supply voltage VDD1 being supplied to the second display controller 144 in the first operation mode. The second power supply unit 142 may be implemented in the form of a transistor or a switch.

According to an exemplary embodiment of the inventive concept, the second power supply voltage VDD2 may be substantially identical to or different from the first power supply voltage VDD1 (see, FIG. 3). The first display subsystem 130 and the second display subsystem 140 of FIGS. 3 and 4 may be included in mutually different power domains regardless of the levels of the first power supply voltage VDD1 and the second power supply voltage VDD2.

The second display controller 144 generates second image data DAT2 and the second control signal CS2 based on the internal image data IIDAT when the power is supplied to the second display subsystem 140 (e.g., when the second power supply voltage VDD2 is supplied to the second display controller 144). The second image data DAT2 may be substantially identical to the internal image data IIDAT, which are not subject to the image enhancing process. Thus, the second display controller 144 may generate the second image data DAT2 by consuming a minimum amount of power with respect to the internal image data IIDAT.

Figure 5:
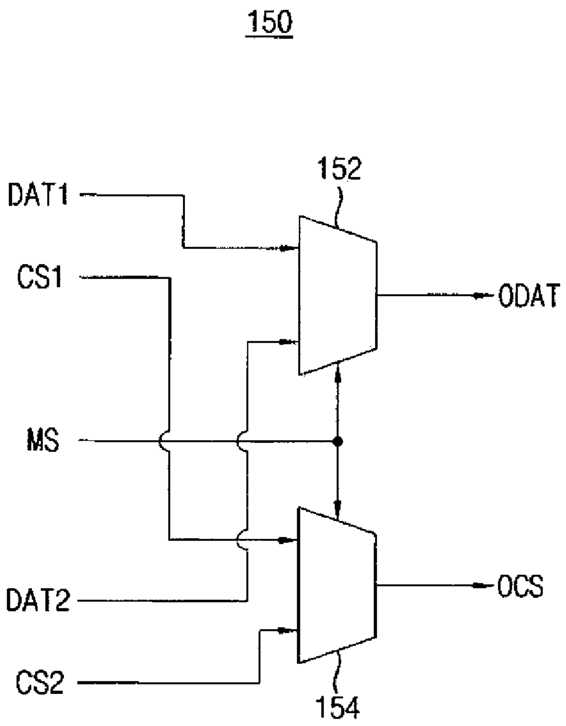
FIG. 5 is a block diagram illustrating an output buffer included in the system on chip of FIG. 1 according to an exemplary embodiment of the inventive concept.

FIG. 5 is a block diagram illustrating an example of the output buffer included in the system on chip of FIG. 1 according to an exemplary embodiment of the inventive concept.

Referring to FIG. 5, the output buffer 150 includes a first multiplexer 152 and a second multiplexer 154.

The first multiplexer 152 includes a first input terminal to receive the first image data DAT1, a second input terminal to receive the second image data DAT2, a selection terminal to receive the mode detection signal MS and an output terminal to selectively output one of the first and second image data DAT1 and DAT2 as the output image data ODAT in response to the mode detection signal MS. For instance, the first multiplexer 152 outputs the first image data DAT1 as the output image data ODAT in the first operation mode (e.g., when the mode detection signal MS has the first logic level) and outputs the second image data DAT2 as the output image data ODAT in the second operation mode (e.g., when the mode detection signal MS has the second logic level).

The second multiplexer 154 includes a first input terminal to receive the first control signal CS1, a second input terminal to receive the second control signal CS2, a selection terminal to receive the mode detection signal MS and an output terminal to selectively output one of the first and second control signals CS1 and CS2 as the output control signal OCS in response to the mode detection signal MS. For instance, the second multiplexer 154 outputs the first control signal CS1 as the output control signal OCS in the first operation mode and outputs the second control signal CS2 as the output control signal OCS in the second operation mode.

Figure 6:
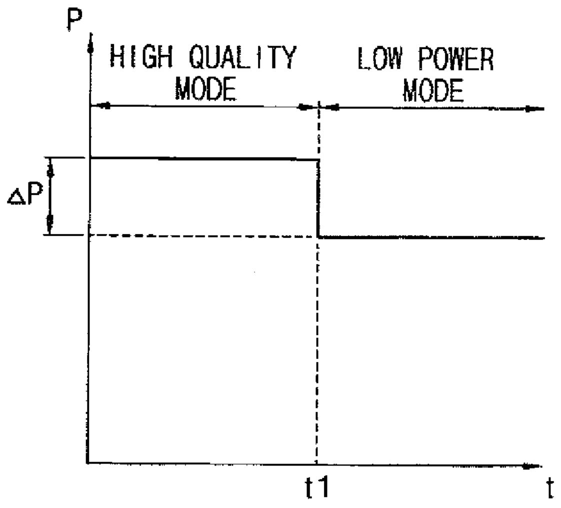
FIG. 6 is a view to explain an exemplary operation of the system on chip of FIG. 1.

FIG. 6 is a view to explain an exemplary operation of the system on chip of FIG 1. FIG. 6 shows a graph representing power consumption of the SoC 100 as a function of the operation mode.

Referring to FIGS. 1 and 6, the SoC 100 operates in the first operation mode (e.g., high quality mode) before time t1 and operates in the second operation mode (e.g., low power mode) after time t1. In the second operation mode, power consumption may be reduced by about ΔP as compared with the first operation mode. In other words, the SoC 100 can reduce power consumption by about ΔP through a power gating operation using the two display subsystems 130 and 140.

Figure 7:
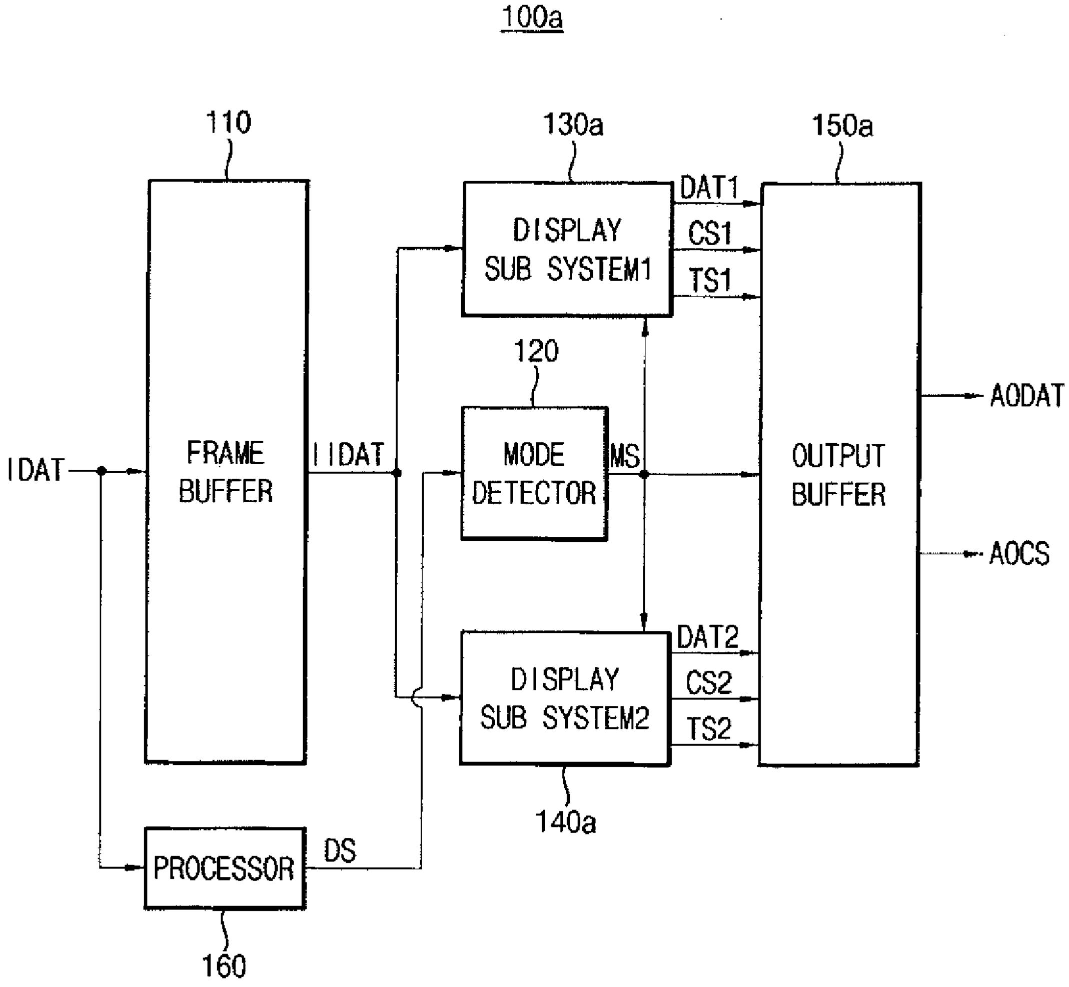
FIG. 7 is a block diagram illustrating a system on chip according to an exemplary embodiment of the inventive concept.

FIG. 7 is a block diagram illustrating the SoC according to an exemplary embodiment of the inventive concept.

Referring to FIG. 7, the SoC 100*a* includes a frame buffer 110, a mode detector 120, a first display subsystem 130*a*, a second display subsystem 140*a* and an output buffer 150*a*. The SoC 100*a* may further include a processor 160.

When compared with the SoC 100 of FIG. 1, the first display subsystem 130*a* of the SoC 100*a* further generates a first trigger signal TS1 and the second display subsystem 140*a* of the SoC 100*a* further generates a second trigger signal TS2, so that the configuration of the output buffer 150*a* is changed. The frame buffer 110, the mode detector 120 and the processor 160 are substantially identical to the frame buffer 110, the mode detector 120 and the processor 160 shown in FIG. 1, and so a detailed description thereof will be omitted in order to avoid redundancy.

The first display subsystem 130*a* is selectively activated based on the mode detection signal MS and generates the first trigger signal TS1 as well as the first image data DAT1 and the first control signal CS1 based on the internal image data IIDAT and the mode detection signal MS. Similarly as shown in FIG. 3, the first display subsystem 130*a* includes the first power supply unit, the first display controller and the image enhancement unit. In an exemplary embodiment, the first display controller generates the third image data, the third control signal and a third trigger signal based on the internal image data IIDAT and the image enhancement unit generates the first image data DAT1, the first control signal CS1 and the first trigger signal TS1 based on the third image data, the third control signal and the third trigger signal.

The second display subsystem 140*a* is activated complementarily with the first display subsystem 130*a* based on the mode detection signal MS and generates the second trigger signal TS2 as well as the second image data DAT2 and the second control signal CS2 based on the internal image data IIDAT and the mode detection signal MS.

Similarly as shown in FIG. 4, the second display subsystem 140*a* may include the second power supply unit and the second display controller. In an exemplary embodiment, the second display controller generates the second image data DAT2, the second control signal CS2 and the second trigger signal TS2 based on the internal image data IIDAT.

The output buffer 150*a* provides the output image data by selecting one of the first and second image data DAT1 and DAT2 based on the mode detection signal MS, provides the output control signal by selecting one of the first and second control signals CS1 and CS2 based on the mode detection signal MS, and provides adjusted image data AODAT and an adjusted control signal AOCS by preventing frame mismatch, which is caused as the output image data and the output control signal are changed, based on the first and second trigger signals TS1 and TS2. For instance, the frame mismatch may occur if the output image data are changed from the first image data DAT1 to the second image data DAT2 as the operation mode is changed from the first operation mode to the second operation mode, or if the output image data are changed from the second image data DAT2 to the first image data DAT1 as the operation mode is changed from the second operation mode to the first operation mode. The output buffer 150*a* may further perform the data processing operation based on the first and second trigger signals TS1 and TS2 to prevent the frame mismatch.

Figure 8:
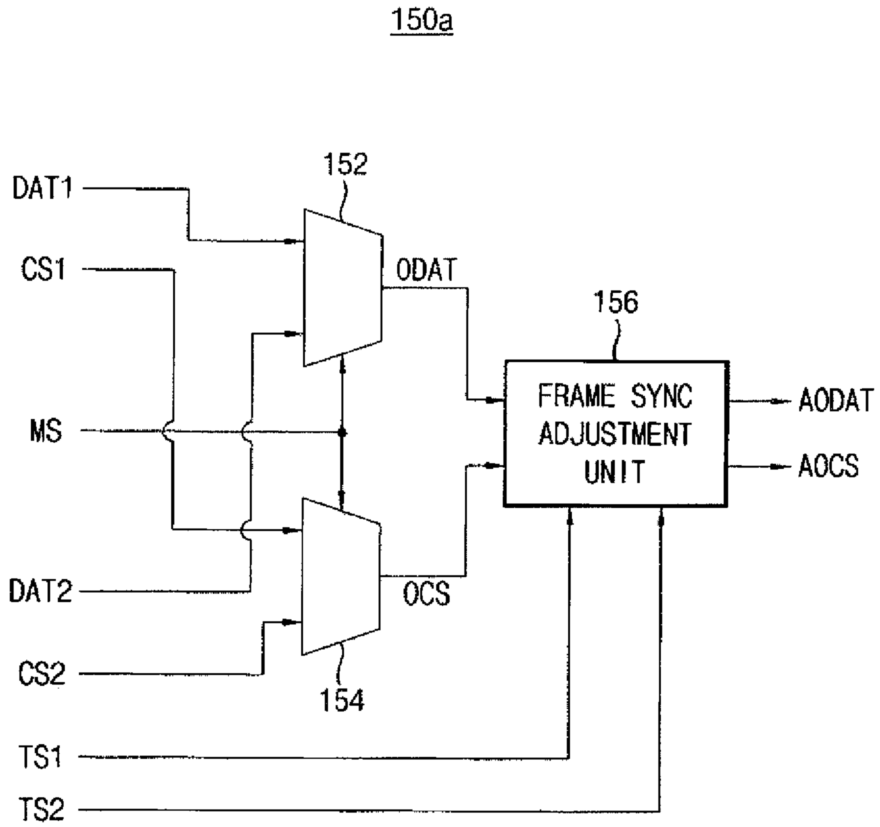
FIG. 8 is a block diagram illustrating an output buffer included in the system on chip of FIG. 7 according to an exemplary embodiment of the inventive concept.

FIG. 8 is a block diagram illustrating an example of the output buffer included in the SoC of FIG. 7 according to an exemplary embodiment of the inventive concept.

Referring to FIG. 8, the output buffer 150*a* includes a first multiplexer 152, a second multiplexer 154 and a frame sync adjustment unit 156.

The first multiplexer 152 includes a first input terminal to receive the first image data DAT1, a second input terminal to receive the second image data DAT2, a selection terminal to receive the mode detection signal MS and an output terminal to selectively output one of the first and second image data DAT1 and DAT2 as the output image data ODAT in response to the mode detection signal MS. The second multiplexer 154 includes a first input terminal to receive the first control signal CS1, a second input terminal to receive the second control signal CS2, a selection terminal to receive the mode detection signal MS and an output terminal to selectively output one of the first and second control signals CS1 and CS2 as the output control signal OCS in response to the mode detection signal MS.

The frame sync adjustment unit 156 generates the adjusted image data AODAT and the adjusted control signal AOCS by preventing the frame mismatch, which is caused as the output image data ODAT and the output control signal OCS are changed, based on the first and second trigger signals TS1 and TS2. For instance, when the output image data are changed from the first image data DAT1 to the second image data DAT2 as the operation mode is changed from the first operation mode to the second operation mode, the frame sync adjustment unit 156 performs the frame sync operation based on the first trigger signal TS1. In addition, when the output image data is changed from the second image data DAT2 to the first image data DAT1 as the operation mode is changed from the second operation mode to the first operation mode, the frame sync adjustment unit 156 performs the frame sync operation based on the second trigger signal TS2. For example, without the trigger signals, if a first half of a display is currently displaying data from the first display subsystem 130, and the second display system 140 is activated, it could result in the first half of the display displaying data from the first display subsystem 130 and the second half of the display displaying data from the second display subsystem (e.g., a frame mismatch). In an exemplary embodiment, a trigger signal is activated as long as its corresponding display subsystem is active. Thus, in an exemplary embodiment, the frame sync adjustment unit 156 knows that a switch between the first and second display subsystem has occurred when the first trigger signal TS1 goes from an active state (e.g., logic high) to an inactive state (e.g., logic low). For example, if a first part of the display has been written with data of the first display subsystem 130, and the first trigger signal TS1 is set to the inactive state, the frame sync adjustment unit 156 can write out predefined data to the remaining part of the display (e.g., all black, all white, etc.) so that the next full frame of data corresponds to data of the second display subsystem 140.

Figure 9:
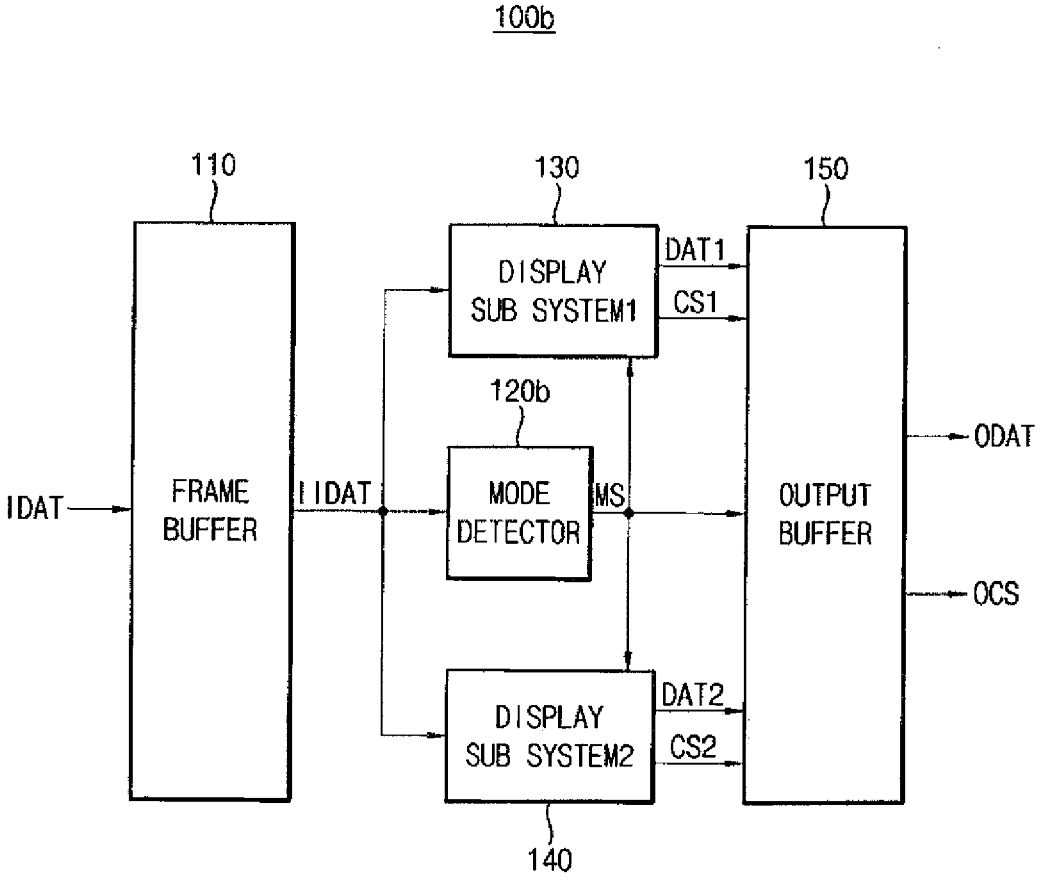
FIG. 9 is a block diagram illustrating a system on chip according to an exemplary embodiment of the inventive concept.

FIG. 9 is a block diagram illustrating the SoC according to an exemplary embodiment of the inventive concept.

Referring to FIG. 9, the SoC 100*b* includes a frame buffer 110, a mode detector 120*b*, a first display subsystem 130, a second display subsystem 140 and an output buffer 150.

When compared with the SoC 100 of FIG. 1, the mode detector 120*b* of the SoC 100*b* does not generate the mode detection signal MS based on the determination signal supplied from the processor, so the configuration of the mode detector 120*b* is changed. The frame buffer 110, the first display subsystem 130, the second display subsystem 140 and the output buffer 150 are substantially identical to the frame buffer 110, the first display subsystem 130, the second display subsystem 140 and the output buffer 150 shown in FIG. 1, and the processor is omitted in the drawing for the purpose of convenience.

The mode detector 120*b* generates the mode detection signal MS, which represents the operation mode according to power consumption, based on the input image data IDAT. For instance, the mode detector 120*b* generates the mode detection signal MS based on the internal image data IIDAT and generates the mode detection signal MS by directly comparing the current frame and the previous frame of the image corresponding to the input image data IDAT and the internal image data IIDAT.

Although not shown in the drawings, the output buffer included in the SoC of FIG. 9 may be configured to prevent the frame mismatch. That is, as described above with reference to FIGS. 7 and 8, the first and second display subsystems included in the SoC of FIG. 9 may further generate the first and second trigger signals, respectively, and the output buffer included in the SoC of FIG. 9 may generate the adjusted image data and the adjusted control signal by preventing the frame mismatch, which is caused as the output image data ODAT and the output control signal OCS are changed, based on the first and second trigger signals.

Figure 10:
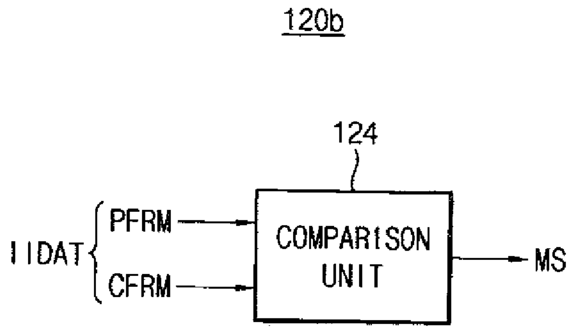
FIG. 10 is a block diagram illustrating a mode detector included in the system on chip of FIG. 9 according to an exemplary embodiment of the inventive concept.

FIG. 10 is a block diagram illustrating a mode detector included in the SoC of FIG. 9 according to an exemplary embodiment of the inventive concept.

Referring to FIG. 10, the mode detector 120*b* includes a comparison unit 124.

The comparison unit 124 generates the mode detection signal MS by comparing first frame data PFRM corresponding to the previous frame with second frame data CFRM corresponding to the current frame. The first and second frame data PFRM and CFRM may be included in the internal image data IIDAT. For instance, if the difference between the first and second frame data PFRM and CFRM is less than a predetermined reference value, the comparison unit 124 may generate the mode detection signal MS representing the second operation mode (e.g., the signal having the second logic level). In addition, if the difference between the first and second frame data PFRM and CFRM is greater than the predetermined reference value, the comparison unit 124 may generate the mode detection signal MS representing the first operation mode (e.g., the signal having the first logic level).

According to an exemplary embodiment of the inventive concept, the mode detector 120*b* further includes a storage unit (not shown) to store the first frame data PFRM.

Figure 11:
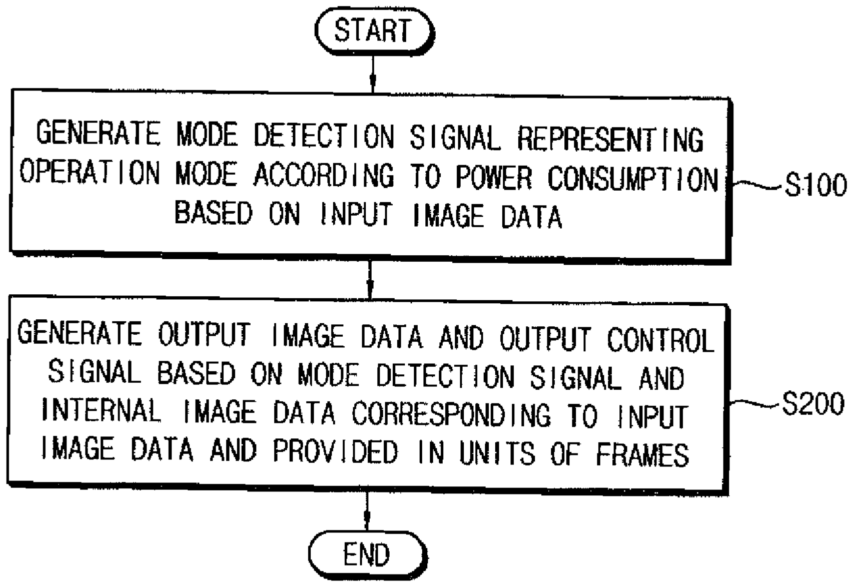
FIG. 11 is a flowchart illustrating a method of driving a system on chip according to an exemplary embodiment of the inventive concept.

FIG. 11 is a flowchart illustrating a method of driving the SoC according to an exemplary embodiment of the inventive concept. FIG. 11 shows the method of driving the SoC including the display control system.

Referring to FIGS. 1 and 11, in a method of driving the SoC according to an exemplary embodiment of the inventive concept, the mode detection signal MS representing the operation mode according to the power consumption is generated based on the input image data IDAT (step S100). For instance, the operation mode may be determined based on the repetition of the frame of the image corresponding to the input image data. If at least two adjacent frames are different from each other, the SoC may operate in the first operation mode (e.g., high quality mode) where the additional process for the current frame of the image is performed. If at least two adjacent frames are substantially identical to each other, the SoC may operate in the second operation mode (e.g., low power mode) where the additional process for the current frame of the image is not performed so the power consumption is reduced. The SoC includes the mode detector to generate the mode detection signal. The mode detector may generate the mode detection signal MS based on the determination signal supplied from the processor (see e.g., exemplary embodiment of FIG. 1) or may generate the mode detection signal MS by directly comparing the two adjacent frames with each other (e.g., see exemplary embodiment of FIG. 9).

Then, the output image data ODAT and the output control signal OCS are generated based on the mode detection signal MS and the internal image data IIDAT (step S200). The internal image data IIDAT corresponds to the input image data IDAT and the frame buffer 110 provides the internal image data IIDAT in units of frames. The SoC includes two display subsystems and complementarily activates the two display subsystems based on the mode detection signal MS. In addition, the SoC generates the output image data ODAT and the output control signal OCS by using the activated display subsystem so that the power consumption can be selectively reduced according to the operation mode.

Figure 12:
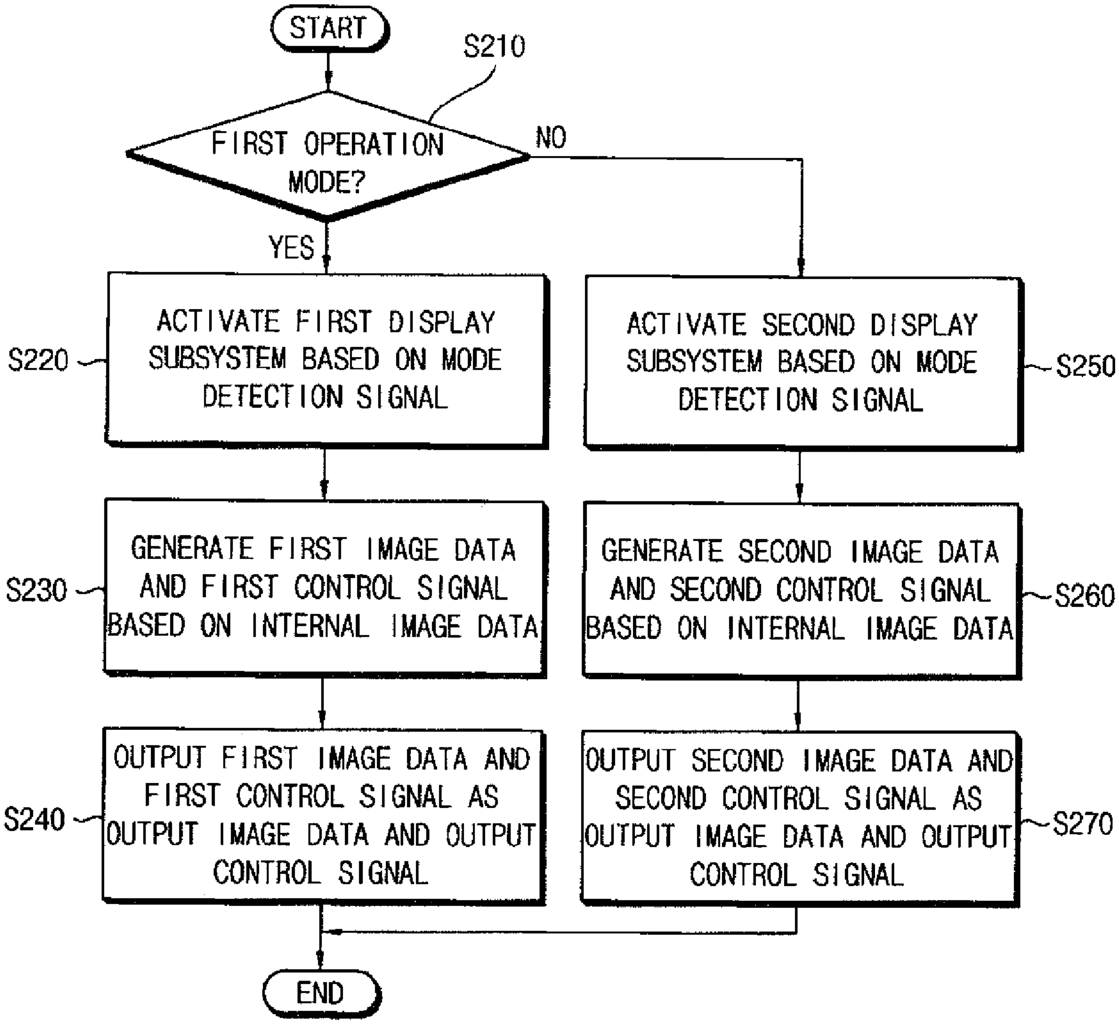
FIG. 12 is a flowchart illustrating a method of generating output image data and output control signals of FIG. 11 according to an exemplary embodiment of the inventive concept.

FIG. 12 is a flowchart illustrating a method of generating the output image data and output control signals of FIG. 11 according to an exemplary embodiment of the inventive concept.

Referring to FIGS. 1, 11 and 12, in step S200, the operation mode of the SoC is determined based on the mode detection signal MS (step S210).

If the operation mode is determined as the first operation mode (step S210: Yes), the first display subsystem 130 is activated based on the mode detection signal MS (step S220) and the first display subsystem 130 generates the first image data DAT1 and the first control signal CS1 based on the internal image data IIDAT (step S230). For instance, as shown in FIG. 3, in the first operation mode, the first power supply unit 132 supplies the first power supply voltage VDD1 to the first display controller 134 and the image enhancement unit 136, the first display controller 134 generates the third image data DAT3 and the third control signal CS3 based on the internal image data IIDAT, and the image enhancement unit 136 generates the first image data DAT1 and the first control signal CS1 based on the third image data DAT3 and the third control signal CS3. The first image data DAT1 may be obtained by performing a quality enhancing process with respect to the internal image data IIDAT. The output buffer 150 may generate the first image data DAT1 and the first control signal CS1 as the output image data ODAT and the output control signal OCS, respectively.

If the operation mode is determined as the second operation mode (step S210: No), the second display subsystem 140 is activated based on the mode detection signal MS (step S250) and the second display subsystem 140 generates the second image data DAT2 and the second control signal CS2 based on the internal image data IIDAT (step S260). For instance, as shown in FIG. 4, in the second operation mode, the second power supply unit 142 supplies the second power supply voltage VDD2 to the second display controller 144, and the second display controller 144 generates the second image data DAT2 and the second control signal CS2 based on the internal image data IIDAT. The second image data DAT2 may be substantially identical to the internal image data IIDAT. The output buffer 150 may generate the second image data DAT2 and the second control signal CS2 as the output image data ODAT and the output control signal OCS, respectively.

Figure 13:
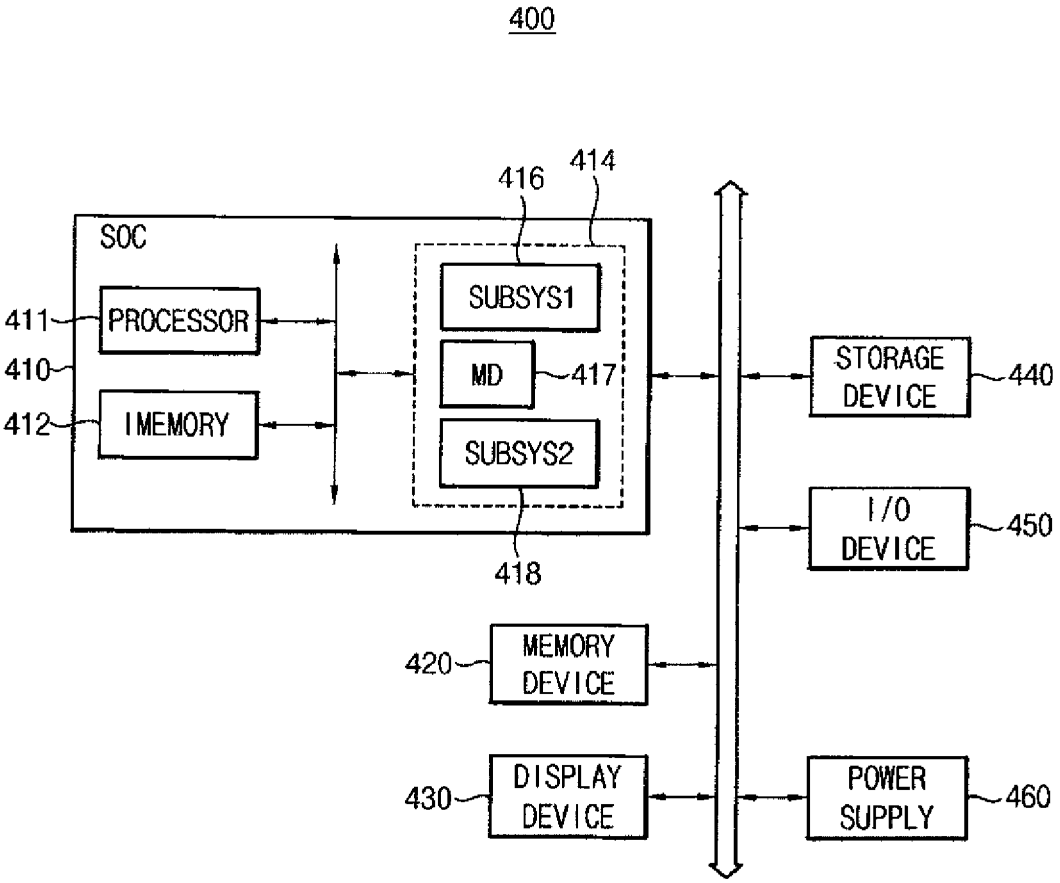
FIG. 13 is a block diagram illustrating an electronic system including a system on chip according to according to an exemplary embodiment of the inventive concept.

FIG. 13 is a block diagram illustrating an electronic system including the SoC according to an exemplary embodiment of the inventive concept.

Referring to FIG. 13, the electronic system 400 includes the SoC 410 and a display device 430. The electronic system 400 may further include a memory device 420, a storage device 440, an input/output (I/O) device 450 and a power supply 460.

The SoC 410 generates an output image data and an output control signal based on the input image data. The SoC 410 may be implemented in the form of one chip in which a processor 411, an internal memory 412 and a display control system 414 are integrated. The SoC 410 may be identical to the SoC 100 of FIG. 1, the SoC 100*a* of FIG. 7 or the SoC 100*b* of FIG. 9.

The processor 411 may execute specific calculations or tasks. The processor 411 may be a microprocessor and/or a central processing unit (CPU). The processor 411 may be connected to the internal memory 412, the display control system 414, the memory device 420, the display device 430, the storage device 440, and the I/O device 450 via a bus, e.g., an address bus, a control bus, and/or a data bus. The processor 411 may be connected to an extended bus, e.g., a peripheral component interconnection (PCI) bus.

The display control system 414 includes a first display subsystem 416, a mode detector 417 and a second display subsystem 418. As shown in FIGS. 1, 7 and 9, the display control system 414 may further include a frame buffer and an output buffer. The mode detector 417 may determine the operation mode according to the power consumption based on the input image data (e.g., based on repetition of image frames corresponding to the input image data). The first and second display subsystems 416 and 418 are complementarily activated according to the operation mode. The first display subsystem 416 that consumes relatively larger power may be activated in the first operation mode to provide an image having a high quality to the display device 430 and the second display subsystem 418 that consumes relatively less power may be activated in the second operation mode to reduce the power consumption of the SoC 410 and the electronic system 400 including the same.

The internal memory 412 and the memory device 420 may store data required to operate the electronic system 400. For example, the internal memory 412 and the memory device 420 may include a volatile memory, e.g., a dynamic random access memory DRAM, a static RAM SRAM, a mobile DRAM, or a nonvolatile memory, e.g., an electrically erasable programmable read-only memory (EEPROM), a flash memory, a phase-change memory PRAM, a resistive random access memory RRAM, a magneto-resistive random access memory MRAM, a ferroelectric random access memory FRAM, a nano floating gate memory (NFGM), a polymer random access memory (PoRAM), etc.

The display device 430 displays images based on the output image data and the output control signal. For example, the display device 430 may include a liquid crystal display (LCD) device, a light emitting diode (LED) display device, an organic LED (OLED) display device, a field emission display (FED) device, etc.

The storage device 440 may include a solid state drive, a hard disk drive and a CD-ROM. The I/O device 450 may include an input tool, such as a keyboard, a keypad or a mouse, and an output tool, such as a printer. The power supply 460 may supply operating voltage required to operate the electronic system 400.

According to at least one exemplary embodiment of the inventive concept, the electronic system 400 and/or components of the electronic system 400 are packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

According to at least one exemplary embodiment of the inventive concept, the electronic system 400 is any mobile system, such as a mobile phone, a smart phone, a tablet computer, a laptop computer, a personal digital assistant PDA, a portable multimedia player PMP, a digital camera, a portable game console, a music player, a camcorder, a video player, a navigation system, etc. According to at least one exemplary embodiment of the inventive concept, the electronic system 400 is any computing system, such as a personal computer (PC), a server computer, a workstation, a tablet computer, a laptop computer, a mobile phone, a smart phone, a PDA, a PMP, a digital camera, a digital television, a set-top box, a music player, a portable game console, a navigation device, etc.

Although not illustrated in FIG. 13, the electronic system 400 may further include a plurality of ports for communicating with a video card, a sound card, a memory card, a universal serial bus (USB) device, other electric devices, etc. In addition, the electronic system 400 may further include a baseband chipset, an application chipset, an image sensor, etc.

Exemplary embodiments can be applied to the SoC and various electronic systems including the same. For instance, exemplary embodiments can be applied to various electronic appliances including display devices, such as a computer, a laptop computer, a mobile phone, a smart phone, an MP3 player, a personal digital assistant (PDA), a portable multimedia player (PMP), a digital TV and a digital camera.

The foregoing is illustrative of exemplary embodiments of the inventive concept and is not to be construed as limiting thereof. Although a few exemplary embodiments have been described, many modifications are possible in the exemplary embodiments without materially departing from the present inventive concept. Accordingly, all such modifications are intended to be included within the scope of the present inventive concept.

What is claimed is:

1. A system on chip (SOC), comprising:
- a frame buffer configured to store input image data in units of frames and configured to provide internal image data in units of frames, the internal image data corresponding to the input image data;
- a mode detector configured to generate a mode detection signal based on the input image data, the mode detection signal representing an operation mode according to power consumption;
- a first display subsystem configured to be selectively activated based on the mode detection signal to generate first image data and generate a first control signal based on the internal image data provided from the frame buffer in units of frames and the mode detection signal;
- a second display subsystem configured to be activated complementarily with the first display subsystem based on the mode detection signal to generate second image data and generate a second control signal based on the internal image data provided from the frame buffer in units of frames and the mode detection signal; and
- an output buffer configured to provide output image data by selecting one of the first and second image data based on the mode detection signal and configured to provide an output control signal by selecting one of the first and second control signals based on the mode detection signal.

2. The SoC of claim 1, wherein the operation mode comprises a first operation mode where an additional process for a current frame corresponding to the input image data is performed when a difference between the current frame and a previous frame is greater than or equal to a threshold and a second operation mode where the additional process for the current frame is not performed when the difference is less than the threshold.

3. The SoC of claim 2, wherein the first display subsystem is activated in the first operation mode and the second display subsystem is activated in the second operation mode.

4. The SoC of claim 3, wherein the first display subsystem comprises:
- a power supply unit configured to selectively supply power to a part of the first display subsystem based on the mode detection signal;
- a display controller configured to generate third image data and a third control signal based on the internal image data when the power is supplied to the first display subsystem; and
- an image enhancement unit configured to generate the first image data and the first control signal by performing an image enhancing process with respect to the current frame based on the third image data and the third control signal when the power is supplied to the first display subsystem.

5. The SoC of claim 3, wherein the second display subsystem comprises:
- a power supply unit configured to selectively supply power to a part of the second display subsystem based on the mode detection signal; and
- a display controller configured to generate the second image data and the second control signal based on the internal image data without performing an image enhancing process with respect to the current frame when the power is supplied to the second display subsystem.

6. The SoC of claim 3, wherein the first and second display subsystems are included in mutually different power domains, respectively.

7. The SoC of claim 2, further comprising:
- a processor configured to control an operation of the SoC and configured to generate a determination signal by comparing the current frame with the previous frame,
- wherein the mode detector generates the mode detection signal based on the determination signal.

8. The SoC of claim 2, wherein the mode detector generates the mode detection signal by comparing the current frame with the previous frame.

9. The SoC of claim 2, wherein the output buffer comprises:
- a first multiplexer comprising a first input terminal to receive the first image data, a second input terminal to receive the second image data, a selection terminal to receive the mode detection signal and an output terminal to selectively output one of the first image data and the second image data as the output image data in response to the mode detection signal; and
- a second multiplexer comprising a first input terminal to receive the first control signal, a second input terminal to receive the second control signal, a selection terminal to receive the mode detection signal and an output terminal to selectively output one of the first control signal and the second control signal as the output control signal in response to the mode detection signal.

10. The SoC of claim 9, wherein the first multiplexer outputs the first image data as the output image data in the first operation mode and outputs the second image data as the output image data in the second operation mode.

11. The SoC of claim 9, wherein the second multiplexer outputs the first control signal as the output control signal in the first operation mode and outputs the second control signal as the output control signal in the second operation mode.

12. The SoC of claim 9, wherein the output buffer further comprises:
- a frame sync adjustment unit configured to prevent frame mismatch occurring when the output image data and the output control signal are changed.

13. The SoC of claim 12, wherein the frame sync adjustment unit prevents the frame mismatch, which occurs when the output image data and the output control signal are changed, based on a first trigger signal provided from the first display subsystem and a second trigger signal provided from the second display subsystem.

14. The SoC of claim 12, wherein the SoC comprises a mobile SoC, a multimedia SoC or an application processor SoC.

15. An electronic system, comprising:

a system on chip (SoC) configured to generate output image data and an output control signal based on input image data; and a display device configured to display images based on the output image data and the output control signal, wherein the SoC comprises:

a frame buffer configured to store the input image data in units of frames and configured to provide internal image data in units of frames, the internal image data corresponding to the input image data;

a mode detector configured to generate a mode detection signal based on the input image data, the mode detection signal representing an operation mode according to power consumption;

a first display subsystem configured to be selectively activated based on the mode detection signal to generate first image data and generate a first control signal based on the internal image data provided from the frame buffer in units of frames and the mode detection signal;

a second display subsystem configured to be activated complementarily with the first display subsystem based on the mode detection signal to generate second image data and generate a second control signal based on the internal image data provided from the frame buffer in units of frames and the mode detection signal; and an output buffer configured to provide output image data by selecting one of the first and second image data based on the mode detection signal and configured to provide the output control signal by selecting one of the first and second control signals based on the mode detection signal.

* * * * *